United States Patent [19]

Meyer et al.

[11] Patent Number: 4,640,138
[45] Date of Patent: Feb. 3, 1987

[54] MULTIPLE AXIS LOAD SENSITIVE TRANSDUCER

[75] Inventors: Richard A. Meyer, Carver; Anthony E. Lowe, Eden Prairie, both of Minn.

[73] Assignee: MTS Systems Corporation, Eden Prairie, Minn.

[21] Appl. No.: 708,596

[22] Filed: Mar. 6, 1985

[51] Int. Cl.$^4$ ............................................. G01L 5/16
[52] U.S. Cl. ................................ 73/862.04; 73/862.65
[58] Field of Search ............ 73/862.04, 862.05, 862.01, 73/862.65, 146, 147

[56] References Cited

U.S. PATENT DOCUMENTS

| | | | |
|---|---|---|---|
| 3,377,849 | 4/1968 | Lebow | 73/862.09 X |
| 3,693,425 | 9/1972 | Starita et al. | 73/862.04 |
| 3,780,573 | 12/1973 | Reus | 73/862.04 X |
| 3,867,838 | 2/1975 | Gerresheim | 73/862.04 |

FOREIGN PATENT DOCUMENTS

| | | | |
|---|---|---|---|
| 2302540 | 7/1974 | Fed. Rep. of Germany | 73/146 |
| 2096777 | 10/1982 | United Kingdom | 73/147 |

OTHER PUBLICATIONS

Controlling a Robot's Motion Speed by a Force-Torque-Sensor for Deburring Problems, Plank et al., presented at the 4th IFAC-IFIP Symposium on Information Control Problems in Manufacturing Technology, 11–14 Oct. 1982, Gaithersburg, Md., USA.

Direct Digital Robot Control Using a Force-Torque Sensor, G. Hirzinger, IFAC Symposium on Real Time Digital Control Applications, Guadalajara, Mexico, Jan. 15–21, 1983.

Some Principles of Transducer Design, Instrument Society of America Conference Preprint, Summer Instrument-Automation Conference and Exhibit, Toronto, Ontario, Canada, Jun. 5–8, 1961.

Model FS6-120A, Astek 6-Axis Force Sensor brochure, published 2-83.

Unique Solutions to Measurement Problems, brochure by Robert A. Denton, Inc., publication date unknown.

Primary Examiner—Charles A. Ruehl
Attorney, Agent, or Firm—Kinney & Lange

[57] ABSTRACT

A load sensitive transducer designed primarily for use in sensing loads in all operational axes necessary to determine loads and forces on a transducer used on tools that are supported on a robot arm. The transducer is a one-piece machined construction to provide for very low hysteresis in operation, as well as obtaining long life by eliminating welding, brazing, adhesives or bolted joints. The transducer will provide six measurements including moments and axial measurements in the three principal axes (X, Y and Z), very low cross talk or likelihood of affecting the reading in one axis from loads in another axis because of the isolation features obtained by using flexure bending beams for the supports for the load carrying member. The integral machined structure permits a small package size that has low axial length and small diameter size to reduce the ultimate loads on the robot arm, and the unit as made provides very high stiffness in all axes.

7 Claims, 13 Drawing Figures

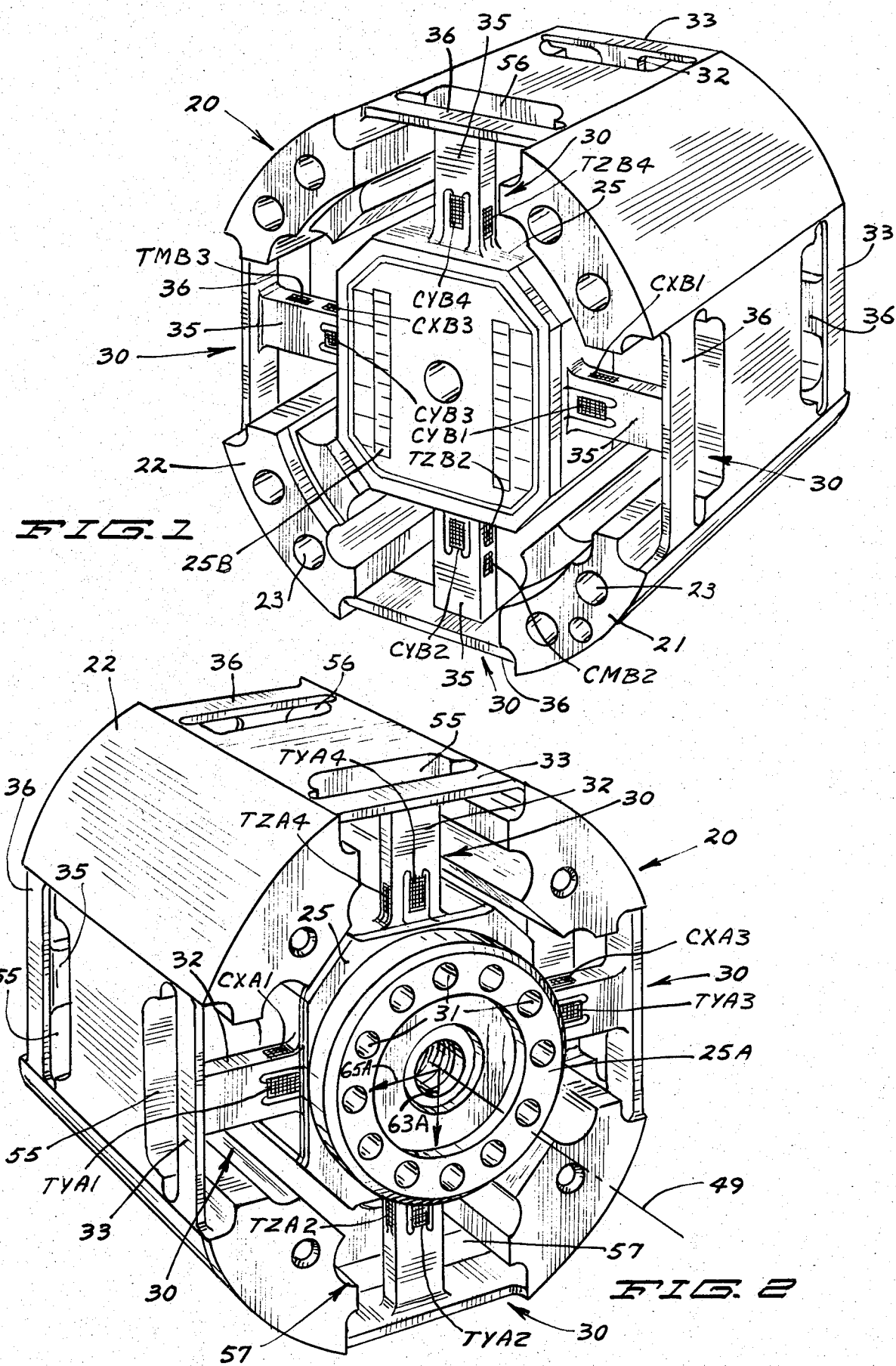

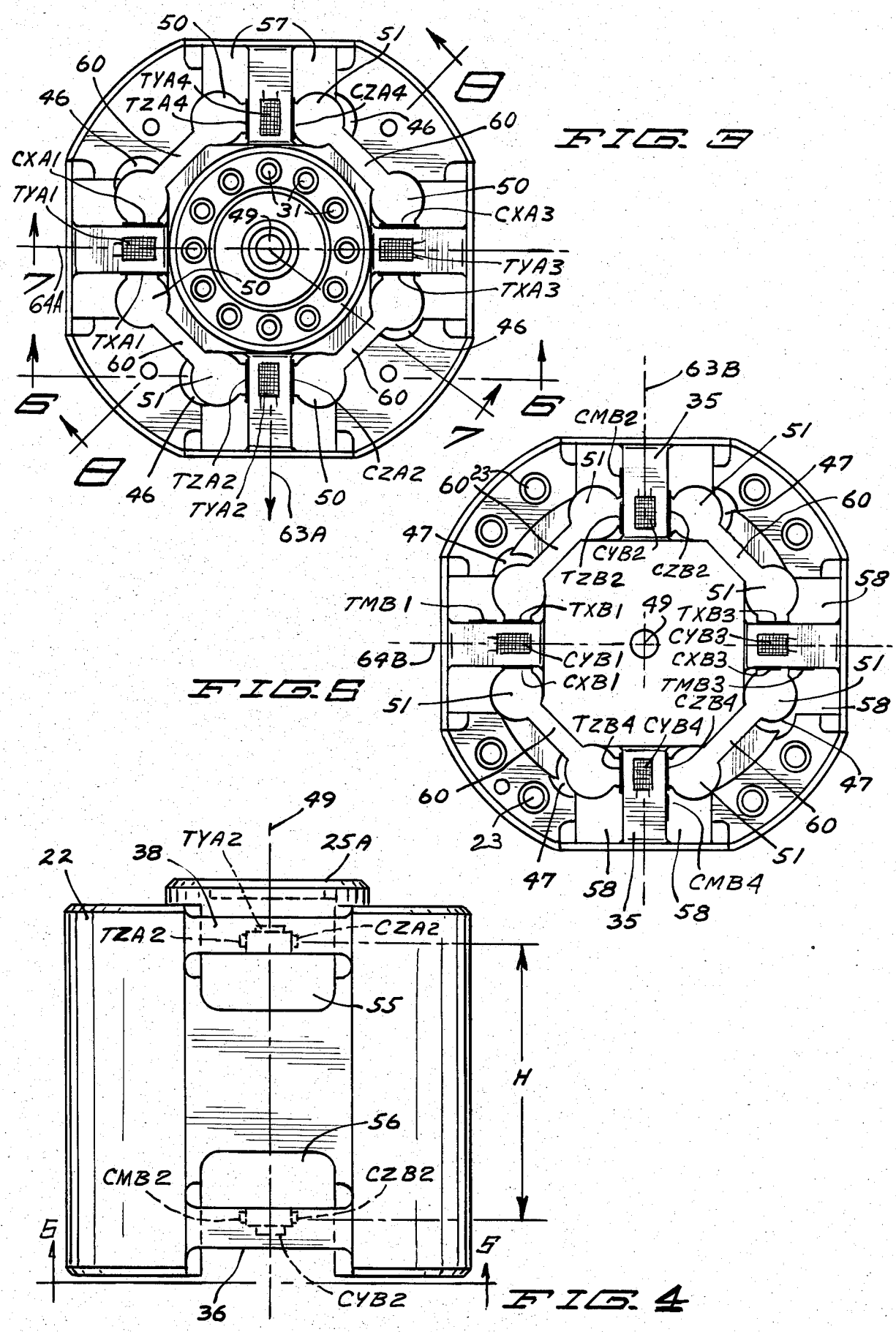

MULTIPLE AXIS LOAD SENSITIVE TRANSDUCER

BACKGROUND OF THE INVENTION

1. Field of the Invention

The present invention relates to load transducers for determining loads exerted between two relatively movable members including both linear forces and rotational moments.

2. Description of the Prior Art

Transducers for determining rotational loads, as well as axial loads have been known. Load cells are commonly used for measuring moments as well as forces in desired planes. Usually the number of measurement axes in a single load cell is restricted, and where the needed measurements occur in several axes and also include several moments, the load cells presently are fabricated giving problems with hysteresis. The existing cells are quite large in size, and in other ways undesirable where a very compact, high strength low hysteresis transducer is desired.

SUMMARY OF THE INVENTION

The present invention relates to a multiple axis, multiple moment transducer that has reliable output because of low hysteresis, and isolation of the forces measured in the desired axis from forces acting in other axes. Also, the transducer is made to isolate the moments exerted about different axes.

The transducer is manufactured from a unitary block of material, so there isn't any welding, brazing, or bolting of various components. The transducer will provide for measurements in the X, Y and Z axes, and moments exerted about such axes. The transducer comprises a load cell made of two relatively movable, concentric members, an outer member and an inner member joined through radial arms forming spiders. Each spider comprises a plurality of radially extending arms integral with the inner member or hub, with the outer ends of the arms supported on the outer member through flexure straps which carry high annular forces but flex from forces in other directions to tend to isolate forces in the individual axes from each other. Thus, less cross talk in the transducer operation.

Strain gauges are used for determining the strain in the spider arms for measuring the loads, and suitable circuitry is then provided for determining the desired forces and loads to be measured.

The transducer is quite short in axial length, which enhances its use with robots, for example, where axial length at the end of a robot arm will greatly increase the moment that the arm has to support. The transducer is also rugged and will carry high loads in all directions while being very sensitive to the individual loads being measured. Also, with the unitary construction, the outer diameter of the overall transducer is kept low, making it usable in a wide variety of applications.

BRIEF DESCRIPTION OF THE DRAWINGS

FIG. 1 is a perspective view of the multiple axis load sensitive transducer made according to the present invention showing the end that would be attached to a robot arm in use;

FIG. 2 is a perspective view of the device of FIG. 1 taken from the opposite or tool mounting end thereof;

FIG. 3 is an end elevational view of the end shown in FIG. 2;

FIG. 4 is a bottom view of the device of FIG. 3;

FIG. 5 is an end view of the device of the present invention taken on line 5—5 in FIG. 4, showing the end which is shown in FIG. 1;

DETAILED DESCRIPTION OF THE PREFERRED EMBODIMENT

Figure 6:
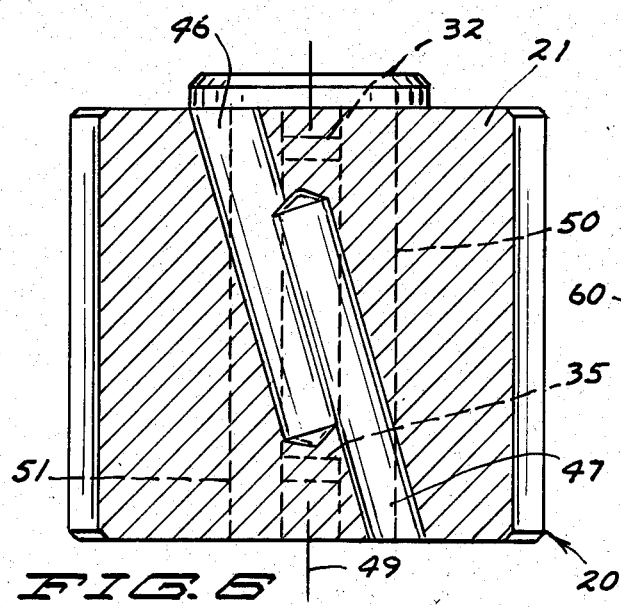
FIG. 6 is a sectional view taken as on line 6—6 in FIG. 3.

In FIG. 1, a multiple axis load sensitive transducer illustrated generally at 20 comprises an initial unitary block of material 21 that can have a desired outer configuration. In use, suitable adapters will be used for coupling the transducer to its support member, and to the tool or device that is being controlled through the transducer. An outer cover housing generally would be placed around the transducer shown in the drawings.

The transducer includes an outer support housing or frame 22 which is mounted onto the main support, such as a robot arm, through cap screws threaded into threaded holes indicated at 23 at one end thereof. A tool support hub member 25 is positioned within the outer support housing or frame 22, and is connected to the outer frame only through two opposite end support spiders, each made up of four beam assemblies shown generally at 30. The tool support hub 25 extends axially along the outer frame or housing 22, and because the unit is formed from a single block 21 of material, there are no welds, or other junctions that cause problems in loading or fatigue life.

The tool support hub 25 has a base or actuator end 25B which is shown in FIG. 1, and a tool support end 25A as shown in FIG. 2. The tool end 25A of the support hub has a plurality of apertures 31 that can be utilized for supporting a tool of desired configuration is a desired manner.

Each of the four beam assemblies 30 at the tool end of the transducer comprise a radially extending beam or arm section 32, integral with the hub 25 and a flexure beam 33 perpendicular to and integrally formed with each of the radial beams 32. The ends of the flexure beam is integrally joined to the outer housing or frame 22.

The flexure beams 33 are supported to the outer housing 22 only at their ends, and are relatively thin in cross section. The radially extending beams 32 are rectilinear in cross section and of greater cross sectional area than the flexure beams 33.

At the base end of the transducer, the four beam assemblies 30 each include radially extending beams or arms 35 integral with the hub 25, that correspond to the beams 32, and flexure beams 36 that are perpendicular to and integral with the beams 35. The ends of flexure beams 36 are integrally joined to the outer housing 22, without any welded or fastener connected joints. The integral construction is made by machining the inner hub 25 that it is separated from the outer housing 22, as will be explained, and by machining in and around the flexure beams 33 and 36, and the radial arms 32 and 35 so that they are free and independent from the outer housing 22 and the inner hub 25.

The flexure beams flex easily about their longitudinal axes (twist loads between the supported end) and also bend easily under forces perpendicular to the plane of the flexure beam. They are fairly rigid in supporting forces annularly, that is, torque loading on the transducer.

As can be seen in FIGS. 1 and 2, if the outer housing 22 is supported on a robot arm, or the like, and a tool is supported on the tool support end 25A of the hub 25 through the use of the fastener openings 31, any relative movement between the tool and the transducer will be resisted only by the action of the beam assemblies 30, including the base end radial arms or beams 35 and flexures 36, and the tool end arms or beams 32 and flexures 33. The radially extending beams 32 are 90° apart, as shown, and also the radially extending beams 35 are 90° apart. The beams 32 are axially aligned with corresponding beams 35.

In order to form the hub 25 so that it will separate from the outer housing 22, and still leave the radially extending beams 32 and 35 at the opposite ends, it is required that the center portions of the hub 25 be separated from the outer housing. Referring specifically to FIGS. 3 through 8, and in particular, FIG. 6, one of the first steps for separating the hub 25 from the outer housing portions 22 of the unitary block 21 is shown. At each of four locations 90° to each other and offset from the planes which bisect the radial arms or beams 32 and 35, along the planes represented by sight line 6—6, typically, a first hole 46 is drilled from the tool support end, as shown in FIG. 3. As shown in FIG. 6, the holes 46 extend only partially through the solid block 21. The axis of each hole 46 is at an angle to the central axis 49. There are four such holes 46 drilled from the tool end, as shown in FIG. 3.

Second holes 47 in FIGS. 4 and 6 are drilled in from the base or actuator end of the block 21 at four corresponding locations parallel to holes 46, partially into the block 21. It can be seen that the bores formed by the holes 46 and 47 intersect in the central area of the block 21. It also can be seen that the radial arms or beams represented in dotted lines and by the numbers 32 and 35 in FIG. 6 are clear of these bores 46 and 47.

A second set of openings or bores indicated in dotted lines at 50 and 51 in FIG. 6 and also seen in the end views of FIGS. 3 and 4, are drilled into the block 21. Four bores 50 are drilled from the tool end and four bores 51 are drilled from the base end, with the axes or center lines of the bores 50 and 51 parallel to the axis 49. The axes of bores 50 and 51 are also on the plane defined by line 6—6. The axes of the bores 46 and 47, are angled at about 15° with respect to axis 49. When the bores 50 and 51 are formed, they also intersect with the openings left by the bores 46 and 47 in the central area of the block 21. Thus, adjacent each of the beams 32 and 35 (which align in pairs in longitudinal direction) there are four bores, 46, 47, 50 and 51 drilled to separate the center portions of the hub 25 from the outer housing portion 22 in the region between aligning beams 32 and 35 and leave material from which to form beams 32 and 35.

In the actual sequence, the bores 46 and 47 are formed at the four locations and then the bores 50 and 51 are formed.

Figure 8:
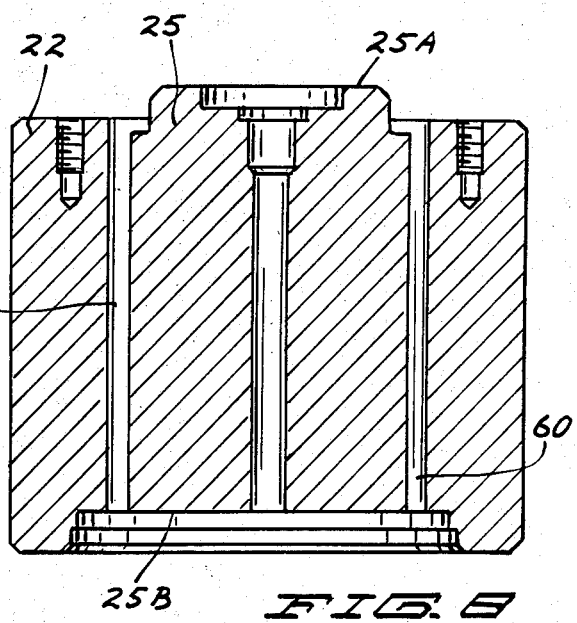
FIG. 8 is a sectional view taken as on line 8—8 in FIG. 3.
Figure 7:
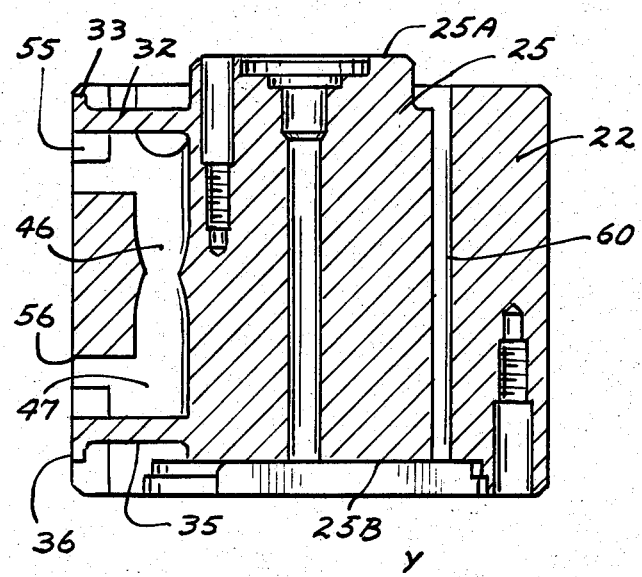
FIG. 7 is a sectional view taken as on line 7—7 in FIG. 3.

The shapes of the intersecting bores 46 and 47 are shown in FIG. 8 and as can be seen, the center portions of the hub 25 between the longitudinally aligning pairs of beams 32 and 35 in the same quadrant are cleared out of material and the hub effectively is separated from the outer housing 22 in this manner in the regions between aligning beams 32 and 35.

After the sixteen bores 46, 47, 50 and 51 have been drilled as shown in FIGS. 3, 4 and 6, the beams 32 and 35, and the flexure members 33 and 36 can be milled using conventional milling techniques, so that the flexure members and beams are formed to their desired size. Note that bores are made as shown in FIG. 5 and indicated at 55 and 56, respectively, at the tool and base ends, respectively, toward the center from the respective flexure members, and the radial side surfaces of the beams 32 and 35 can be formed using normal milling machines and drills to provide the desired size and shape openings 57 and 58 as shown in FIGS. 3 and 4.

At this stage, the hub 25 still will be fixed to the outer housing at the corners between one bore 46 and the bore 50 in the same quadrant as shown in FIG. 3. A saw is inserted into selected bores that have been made and slits indicated at 60 are cut between the adjacent bores at the diagonal corners to form the hub 25 by separating it from the outer housing 22.

When the hub 25 and the outer housing 22 have been separated as shown, and the radial beams or arms and flexures formed, the outer configuration is formed as desired. The forces from the three-dimensional coordinate system having X, Y and Z axes acting between the hub 25 and the outer housing 22 will be reacted, as stated, only through the beam assemblies 30 comprising the flexure members that actually join the respective radial beams or arms 32 and 35 to the outer housing.

Figure 9:
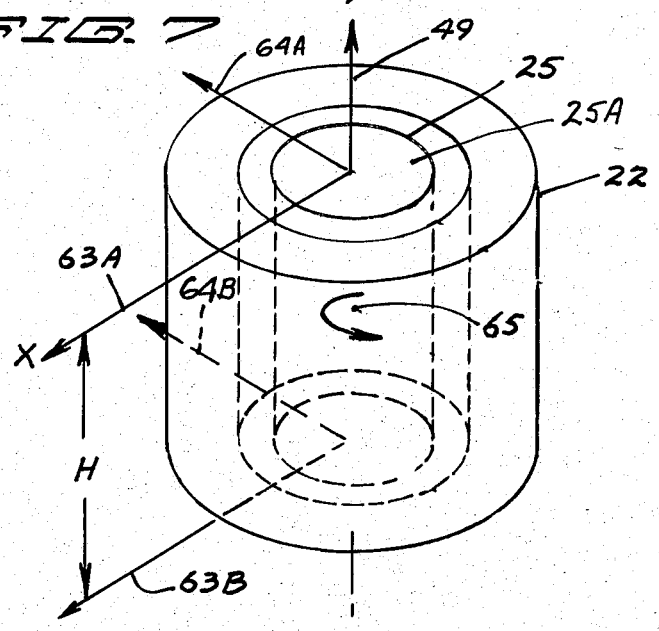
FIG. 9 is a schematic representation of the forces applied to the device of the present invention.

FIG. 9 is a graphical illustration schematically shown to illustrate the three axis forces that will act on the transducer. The central longitudinal axis of the transducer is indicated at 49, and the hub 25 is merely indicated as a cylinder.

The outer housing 22 is represented in a line drawing, and the longitudinal axis 49 comprises the "Y" axis with the tool end 25A represented as the top. The "X" axis is perpendicular to the "Y" axis and is shown at the top or tool end at 63A, and at the base or support end at 63B, and the "Z" axis is mutually perpendicular to the "X" and "Y" axes, and is represented at 64A at the top and at 64B at the bottom. The axial distance between the beams at the tool end or top of the transducer and the beams at the bottom or base end of the transducer is indicated at H in FIGS. 5 and 9. Halfway between the beams along the longitudinal axis is the neutral axis, which is represented at 65.

Figure 10:
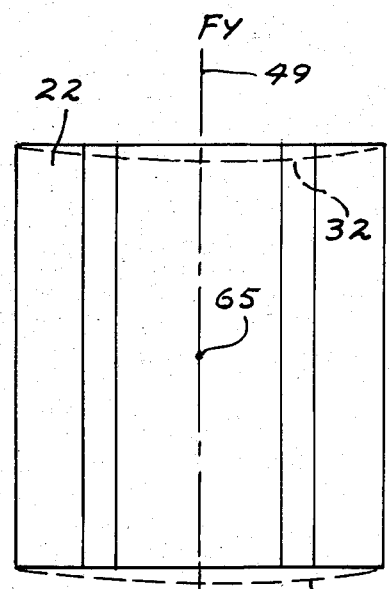
FIG. 10 is a schematic representation of the deflections when force is applied in a "Y" direction of FIG. 9.

FIG. 10 represents in a line drawing the deflection in dotted lines of the beams or arms 32 and 35, when forces are applied along the "Y" or longitudinal axis. This is merely schematic to illustrate that the radial beams or arms 32 and 35 will bend between the hub 25 and the support to the outer housing 22 through the flexures 33 and 36. Forces along the "Y" axis are represented as $F_Y$.

Figure 11:
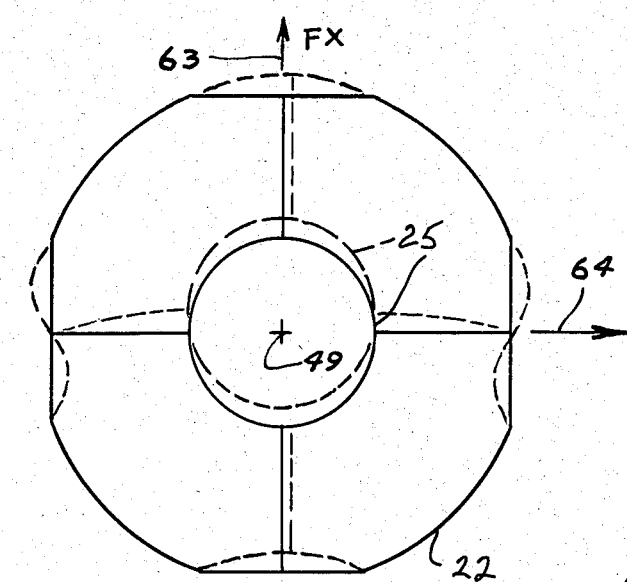
FIG. 11 is a schematic representation of deflection when forces are applied in the "X" or "Z" direction shown in FIG. 9.

In FIG. 11, a schematic representation of the tool end of the transducer is shown. The view is similar to the view of FIG. 3. Forces either along the "X" axis or the "Z" axis indicated at 63 and 64 will cause the central axis 49 to shift laterally, and this may occur either at the tool end or the base or support end in the same manner. When this loading occurs, for example, if it is in the direction along the "X" axis as shown by the arrow $F_X$ along axis 63, the flexure beams perpendicular to the "X" axis will be subjected to bending, and move from a straight line position to assume the shape of a bending beam supported at its ends as shown in dotted lines. The radial arms along the X axis will be under tension and compression. The flexure beams which are along the "Z" axis 64 and at right angles to the force along the axis 63, will be bent through the radial arms into an "S" configuration as shown in exaggerated condition in dotted lins. The radial arms on the Z axis will bend generally as represented in the dotted lines in FIG. 11. If the force is reversed along axis 63, the configurations of the radial arms and flexures would be reversed, and if the force is along axis 64, the configurations would then be shifted 90°, that is the flexures along the Z axis would bow out and the flexures along axis 63 would form a general S shape.

The forces on the radial arms at the tool end and the base or support end are individually measured, and thus the total force along either the "X" or the "Z" axis will be an average of the forces measured at the tool and base ends, respectively, and the moment exerted on the hub 25 tending to twist it around its neutral axis 65 (FIGS. 9 and 10) will be the top force minus the bottom force, times the distace H between the sets of arms or beams 35 and 32.

Figure 12:
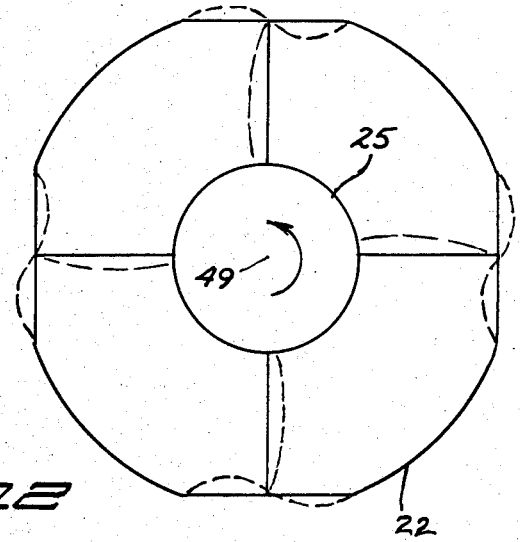
FIG. 12 is a schematic representation of deflections under moment loading on the device of the present invention.

FIG. 12 illustrates the bending of the radial arms or beams and the flexure beams under moments exerted about the "Y" axis, that is torque loads about the central, longitudinal axis 49. As shown, as the hub 25 tends to rotate relative to the outer housing 22, the flexure beams will assume an "S" curve shape, and the radial beams 32 and 35 will tend to bend adjacent their juncture to the hub 25, as shown in dotted lines.

Strain gauge instrumentation is utilized with the present transducer, and a typical strain gauge bridge is shown in FIG. 14. The resistors R1, R2, R3 and R4 are represented as typical, and the location of such resistors in different bridges will be explained. Excitation voltage is provided along leads 70 and 71, and the output voltage signal is provided along leads 72 and 73 in a typical strain gauge bridge. A modulus resistor indicated at 74 is provided for obtaining the proper scale for the modulus of elasticity of the transducer, and zeroing can be accomplished with zero balance wire connections shown at 75, and temperature compensation can be obtained with the temperature compensation connection wires 76.

Strain gauge instrumentation is shown schematically in relation to FIGS. 1–5 with reference to FIGS. 9–13 as well. On designating strain gauge location, the tool end is represented as the "A" end and the base or support end represented as the "B" end.

Because the individual radial arms have strain gauges used for sensing different strains, as shown in FIG. 3, the arms are designated as arms one, two, three and four starting with the left-hand radial arm 32 that is shown in FIG. 3 and going counterclockwise.

The strain gauge designations used herein are letter and number designations. The first letter "C" or "T" stands for compression or tension. The next letter stands for the axis of measurement (X, Y, Z or M, that is, moment about the "Y" axis). The third letter designates the tool (A) end or base (B) end, and the numeral at the end of the designation indicates the quadrant of the radial arm on which the strain gauge is placed. Thus, typically, looking at FIG. 3, the designation "CXA1" is a compression gauge for measuring "X" axis strain at the tool (A) end, and on the arm 32 in the number one quadrant or number one sector.

On that same arm (No. 1), the designation TYA1 is a tension gauge for measuring "Y" axis strain at the tool end and on the No. 1 arm.

On this same arm, the strain gauge TXA1 is on the side of the arm opposite from the CXA1 gauge, and is a tension gauge for measuring "X" axis strain on the tool end number one arm.

Arm Number two, shown in FIG. 3, has the gauges TZA2 (tension gauge for "Z" axis strain on the tool end, arm number two) on one side of the arm, and the strain gauge CZA2 is on the opposite side of the arm. Strain gauge TYA2 is on the front surface or outer surface of this arm. Tool end arm three which is 180° from tool end arm 1, has the gauges CXA3, TXA3 and TYA3 thereon. Tool end arm four, which is the top arm, has strain gauges TZA4, TYA4, and CZA4 thereon.

At the opposite or base end of the transducer, shown in FIG. 4, it can be seen that in the figure orientation, the number one radial arm or beam is to the left-hand side of the figure. This is aligned axially with the number one arm on the tool end. Also, in this view, the arm or quadrant numbering goes in clockwise direction. Thus, on the left-hand side of FIG. 4, arm one has gauges CXB1 on the bottom side and CYB1 on the outer face. On the opposite edge or side of this arm from the CXB1 gauge, there are two strain gauges. Adjacent hub 25 is TXB1, which is for measuring strains in the "X" axis at the base end and it is opposite from CXB1. A separate strain gauge, TMB1 is provided on this same arm surface for measuring the moments occasioned by torque about the longitudinal axis 49 carried between the hub 25 and the outer housing 22. In the designation, the torque is considered as tending to rotate the housing 22 counterclockwise in FIG. 4 relative to the hub 25.

Radial arm or beam two at the base end, which is oriented to the top of FIG. 4, has gauges CZB2; CYB2; TZB2; and CMB2.

On arm three, which is the arm or beam 35 to the right in FIG. 4, the strain gauges on the sides of this arm or beam are TXB3; and on the opposite side, CXB3 and TMB3. On the face of this arm or beam, the strain gauge is CYB3.

On radial arm or beam 35 which is in the fourth position, (to the bottom of FIG. 4) the strain gauges are CMB4 and CZB4. On the opposite side of the arm, the strain gauge is TZB4, and on the face of the arm the strain gauge is CYB4.

It should be noted that the moment strain gauges (TM and CM) are arranged so that if there is a torque on the housing acting counterclockwise in FIG. 4, tending to rotate the hub portion 25, two of the moment strain gauges will be in compression (CMB4 and CMB2) and two will be in tension (TMB1 and TMB3). Thus, the side of the respective radial arm 35 on which the strain gauges are mounted is selected so that two of the gauges will be in tension and two in compression to provide a full bridge. It should also be noted that the moment sensing strain gauges are only at the base or support end of the transducer shown in FIG. 4.

The strain gauges for sensing loads or forces along the X and Z axes, as well as those for sensing forces along the Y axis are positioned at both ends of the transducer. The ability to individually determine the X and Z axes loads at the opposite ends of the transducer permit the determination of the average load along these axes and moments about the axes as well.

Likewise, the set of strain gauges at both ends of the transducer for sensing Y axis strains or forces provide a double output to insure adequate output on the relatively rigid radial arms.

The use of the flexure members 33 and 36 aids in isolating any cross coupling loads, and also, the individual sensing at the opposite ends of the transducer permits determining the moments about the Z and X axes.

The basic forces involved are $F_Y$, which is independent of other outputs, and $M_Y$ which is also independent of other outputs and is not cross coupled. The moments are sensed by the moment sensing strain gauges TMB1; CMB2; TMB3; and CMB4.

Additionally, the moments about the Z and X axes, and the forces along the X and Z axes are determined as follows:

$$M_Z = (F_{AX} - F_{BX}) \times H$$

$$M_X = (F_{AZ} - F_{BZ}) \times H$$

$$F_X = \frac{F_{AX} + F_{BX}}{2}$$

$$F_Z = \frac{F_{AZ} + F_{BZ}}{2}$$

Cross coupling may occur in relation to the moments about X and the forces about Z, and also cross coupling may occur in relation to the moments about the Z axis, and the forces along the X axis ($M_Z$ and $F_X$. However, the flexibility of the flexures 33 and 36 in the degrees of freedom provided minimizes the cross coupling effects.

Figure 13:
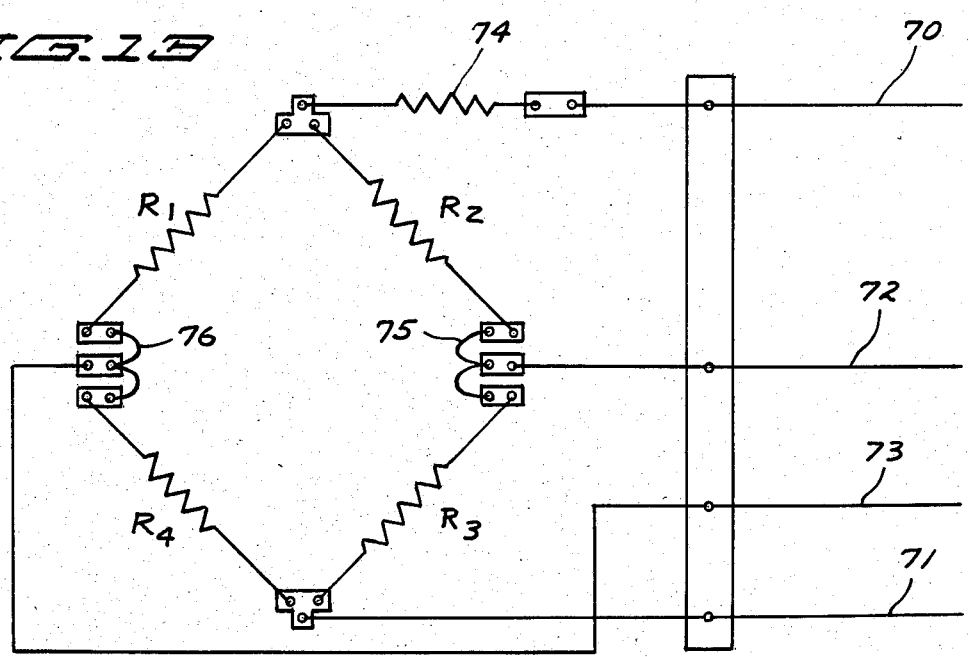
FIG. 13 is a typical strain gauge bridge circuit used for sensing loads, the gauges of which will be selected in relation to the support arms for obtaining the necessry forces and moments for needed measurements.

In order to obtain the signals that represent the forces, acting on the transducer, several strain gauge bridges are formed using the strain gauges in selected bridge arms represented by resistors R1-R4 of FIG. 13. The individual bridge outputs will provide signals that indicate the various forces, from which the moments about the X and Z axes can be determined, and a separate bridge can be used for determining the moment about the Y axis.

The following tables show each of the individual bridges used with the strain gauges corresponding to the respective resistors in order to obtain the necessary output:

TABLE I

Bridge Output equals $F_{AX}$
(X Axis force at Tool End)

| Resistor | Strain Gauge |
|---|---|
| $R_1$ | TXA1 |
| $R_2$ | CXA1 |
| $R_3$ | TXA3 |
| $R_4$ | CXA3 |

TABLE II

Bridge Output Equals $F_{BX}$
(X axis force at base or support end)

| Resistor | Strain Gauge |
|---|---|
| $R_1$ | TXB1 |
| $R_2$ | CXB1 |
| $R_3$ | TXB3 |
| $R_4$ | CXB3 |

TABLE III

Bridge Output equals $F_{AZ}$
(Z Axis force at Tool End)

| Resistor | Strain Gauge |
|---|---|
| $R_1$ | TZA2 |
| $R_2$ | CZA2 |
| $R_3$ | TZA4 |
| $R_4$ | CZA4 |

TABLE IV

Bridge Output Equals $F_{BZ}$
(Z Axis Force at Base or Support End)

| Resistor | Strain Gauge |
|---|---|
| $R_1$ | TZB2 |
| $R_2$ | CZB2 |
| $R_3$ | TZB4 |
| $R_4$ | CZB4 |

TABLE V

Bridge Output Equals $F_Y$
(Y Axis Force)

| Resistor | Strain Gauge |
|---|---|
| $R_1$ | TYA1 and TYA4 (In Series) |
| $R_2$ | CYB4 and CYB1 (In Series) |
| $R_3$ | TYA3 and TYA2 (In Series) |
| $R_4$ | CYB2 and CYB3 (In Series) |

TABLE VI

Bridge Output Equals $M_Y$
(Moment About Y Axis)

| Resistor | Strain Gauge |
|---|---|
| $R_1$ | TMB1 |
| $R_2$ | CMB2 |
| $R_3$ | TMB3 |
| $R_4$ | CMB4 |

Two strain gauges for determining the force along the Y axis are used in series in each bridge arm, as shown above, to form the four arms of the bridge.

It should also be noted that the tension gauges are in opposite arms of the bridge, and the compression gauges are also in opposite arms of the bridge.

As stated, the unitary (one piece) construction, and the flexure connections which permit isolating the loads from each other to minimize cross coupling, reduce hysteresis and other problems with operation.

Although the present invention has been described with reference to preferred embodiments, workers skilled in the art will recognize that changes may be made in form and detail without departing from the spirit and scope of the invention.

What is claimed is:

1. A load transducer for measuring loads in a plurality of axes including means forming an outer housing;
   means for attaching said outer housing to a first member;

a hub located substantially within said outer housing and being adapted to carry a second member;

first and second spiders joining said hub to said outer housing, each spider comprising a plurality of support arms spaced substantially 90° apart and extending substantially radially from said hub, the support arms of each spider being aligned in a separate spider plane generally perpendicular to a reference central longitudinal axis through the outer housing, said spiders being spaced apart from each other along the central longitudinal axis;

separate strap means for joining the outer ends of each of said support arms to said outer housing comprising flexure beams which are integrally supported on the housing at the opposite ends of the flexure beams and integrally joined to respective ends of the support arms, said flexure beams having planes parallel to the central longitudinal axis and having beam longitudinal axes, said flexure beams being flexible to deflect under loads between said outer housing and hub tending to twist the flexure beams about the beam longitudinal axis and under loads acting perpendicular to the planes of the flexure beams, and carrying substantial loads in directions parallel to the plane of the flexure beams;

means to individually measure strain in each of said support arms when said hub is loaded relative to the outer housing, said strain being measured in a direction along said central longitudinal axis, and in at least two mutually perpendicular directions lying in each of said spider planes, and said means to measure strain including means to sense loads in said support arms caused by rotational loads about said central longitudinal axis between said outer housing and said hub; and said housing, said hub, said support arms of said spiders and said flexure beams being formed as an integral unit from a single block of material with no individual separable pieces.

2. The apparatus as specified in claim 1 wherein said spiders each comprise four arms positioned at substantially 90° to each other in the respective spider plane, and the beam longitudinal axis of said flexure beams are centered on the respective spider plane.

3. The apparatus as specified in claim 1 wherein the means to attach said outer housing to a first member is adjacent one end of the transducer, and the means to attach the hub to a second member is adjacent a second opposite end of said transducer.

4. The apparatus as specified in claim 3 wherein said means to measure strain comprises strain gauges positioned on said arms adjacent said hub.

5. The apparatus as specified in claim 4, wherein each of the support arms forming the respective spiders has a substantially uniform rectilinear cross sectional shape throughout its length from adjacent the hub to said flexure beams, and wherein strain gages are mounted on each of said support arms on three surfaces of the arms adjacent said hub.

6. The apparatus of claim 1, said flexure beams comprising rectilinear cross section beams.

7. The apparatus as specified in claim 1 wherein each of said support arms forming said spiders has a generally rectilinear cross section, and the arms have side surfaces facing in annular directions around said central longitudinal axis, and said means to measure strain comprises strain gage means mounted on said side surfaces and on the outwardly facing surfaces of each of the support arms.

* * * * *